United States Patent [19]
Buchler

[11] Patent Number: 5,790,405
[45] Date of Patent: Aug. 4, 1998

[54] METHOD AND APPARATUS FOR DETECTING CIRCULAR TORPEDO RUNS

[75] Inventor: Robert J. Buchler, Calabasas Park, Calif.

[73] Assignee: Litton Systems, Inc., Woodland Hills, Calif.

[21] Appl. No.: 532,082

[22] Filed: Sep. 22, 1995

Related U.S. Application Data

[60] Provisional application No. 60/001,670, Jul. 31, 1995.
[51] Int. Cl.$^6$ .................................................. G01C 21/00
[52] U.S. Cl. .................. 364/453; 364/559; 364/424.025
[58] Field of Search ........................... 364/453, 454, 364/559, 424.025, 423.098; 114/20.1, 23, 24

[56] References Cited

U.S. PATENT DOCUMENTS

| | | | |
|---|---|---|---|
| 4,589,610 | 5/1986 | Schmidt | 244/3.19 |
| 4,740,887 | 4/1988 | Rutenberg | 364/148 |
| 5,172,323 | 12/1992 | Schmidt | 364/453 |

Primary Examiner—Michael Zanelli
Attorney, Agent, or Firm—Robert E. Malm

[57] ABSTRACT

The present invention is a method and apparatus for detecting torpedo guidance system failures which are likely to cause the torpedo to make a circular run. The method consists of measuring the yaw-axis angular velocity of the torpedo and comparing this measurement with a computed estimate of the yaw-axis angular velocity based on measurements of torpedo dynamics other than the yaw-axis angular velocity. If the difference between the measured and computed values exceeds a threshold value, the presumption is that the torpedo is in a circular run and should be destroyed. The invention envisions various levels of precision in computing the estimate of the yaw-axis angular velocity. The various levels of precision involve the measurement of one or more of the group of dynamics parameters consisting of the three components of acceleration and the two components of angular velocity along the pitch and roll axes. Measured values of these dynamics parameters in various combinations together with other data such as gravity, earth angular velocity, torpedo elevator and rudder angles, propeller angular velocity, and the coefficients in the equations that define the dynamics of a torpedo permit the computation of the torpedo yaw-axis angular-velocity with various levels of precision.

48 Claims, 5 Drawing Sheets

METHOD AND APPARATUS FOR DETECTING CIRCULAR TORPEDO RUNS

CROSS-REFERENCES TO RELATED APPLICATIONS

This application claims the benefit of the earlier filing date of the provisional application having the same title and assigned the Ser. No. 60/001670, filed Jul. 31, 1995.

BACKGROUND OF THE INVENTION

This invention relates generally to the detection of torpedo guidance failures which result in circular runs by a torpedo and consequent dangers to the launching platform. More specifically, the invention relates to circular-run detection by detecting inconsistencies between the measured torpedo dynamics and known constraints on the "swim" dynamics of the torpedo.

The present circular-run detection method, for torpedo inertial systems containing a redundant azimuth gyro, is simply to compare the two azimuth gyro outputs of the inertial measurement unit and declare a guidance failure when an unacceptably large discrepancy occurs.

SUMMARY OF THE INVENTION

The present invention is a method and apparatus for detecting torpedo guidance system failures which are likely to cause the torpedo to make a circular run. The method consists of measuring the yaw-axis angular velocity of the torpedo and comparing this measurement with a computed estimate of the yaw-axis angular velocity based on measurements of torpedo dynamics other than the yaw-axis angular velocity. If the difference between the measured and computed values exceeds a threshold value, the presumption is that the torpedo is in a circular run and should be destroyed. The invention envisions various levels of precision in computing the estimate of the yaw-axis angular velocity. The various levels of precision involve the measurement of one or more of the group of dynamics parameters consisting of the three components of acceleration and the two components of angular velocity along the pitch and roll axes. Measured values of these dynamics parameters in various combinations together with other data such as gravity, earth angular velocity, torpedo elevator and rudder angles, propeller angular velocity, and the coefficients in the equations that define the dynamics of a torpedo permit the computation of the torpedo yaw-axis angular-velocity with various levels of precision.

DESCRIPTION OF THE PREFERRED EMBODIMENTS

The method practiced by the circular-run detection apparatus (CRDA) is to detect inconsistencies between the torpedo dynamics (i.e. acceleration, attitude rate) as measured by inertial sensors that are part of an inertial measurement unit (IMU) and known a-priori constraints on the swim dynamics imposed by the physical properties of the torpedo. For example, since the torpedo nominally swims in the direction that it is pointed, cross-body acceleration, as measured by the accelerometers and after appropriate corrections, is a measure of turn rate, and this turn rate should be consistent with turn rate as measured by the azimuth gyro. Any significant discrepancy would indicate a guidance failure.

The error in estimated turn rate using the accelerometers is a function of the IMU instrument errors themselves but may be reduced by the quality and abundance of information made available to the IMU from external sources such as: (1) initial conditions prior to launch, (2) torpedo sensor information obtained during swim, and (3) a priori knowledge of the torpedo dynamics model. The more information made available to the IMU, the better the estimate of turn rate.

Figure 1:
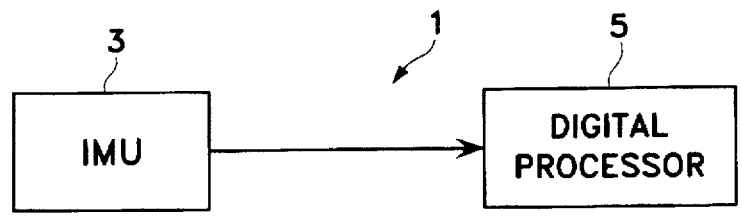
FIG. 1 is a block diagram of the circular-run detection apparatus.

The preferred embodiment of the CRDA 1 is shown in FIG. 1. It consists of the IMU 3 and the digital processor 5. The software which controls the operations of the digital processor 5 provides a full-up navigation capability. The CRDA is initialized prior to launch of the torpedo with initial coordinates, true heading, pitch, roll, and three coordinates of velocity. During swim, external inputs of propeller speed and control surface deflection angles are continuously made available to the CRDA. The CRDA continuously compares external inputs with internal inertial measurements of torpedo motion. Knowledge of nominal zero up and side-slip augmented by a six-degree-of-freedom torpedo dynamics swim model permits the detection with high probability a guidance failure that could result in a circular run with low false-alarm probability.

The torpedo cannot have a component of velocity in the cross-body direction (except as a result of a small estimatable side-slip angle $\beta$). Any cross-body acceleration must be due to centrifugal acceleration in a turn. If the azimuth gyro is in error, cross-body acceleration will not be consistent with heading rate. The observation error is chosen to be cross-body velocity which is expected to be zero when corrected for angle-of-attack $\alpha$ and side-slip angle $\beta$.

During a turn, the torpedo experiences a small side-slip angle $\beta$. $\beta$ is eliminated as an error source since the programmed six-degrees-of-freedom dynamic equations for the torpedo provide estimated values of α and β. Torpedo body velocity is resolved through α and β to give track components of velocity which are then observed rather than body velocity. In addition, the track components of velocity are integrated into track components of position change, which further reduces vibration problems.

Although control-surface deflection-angle inputs are not essential to the system, they provide useful relevant information and are used if available.

As the torpedo speed decreases, the cross-body acceleration in a turn decreases, thus lowering the error detection sensitivity. The CRDA will still detect a bad azimuth gyro, however, because a wrong heading will cause large tilt rate errors due to wrong level-earth angular velocity, which will cause detectable velocity errors.

A more or less constant sea drift will not defeat the CRDA. The apparent velocity bias will be attributed to level gyro drift error and will not cause cross-body velocity error. After a turn, even the erroneous gyro drift error will be removed.

In summary, the following initial-condition inputs are supplied to the CRDA prior to launch: latitude, longitude, and altitude; pitch, roll, and heading; velocity east, north, and up; and sea-drift east and north (if available). After launch, propeller speed, control-surface deflection angles, and IMU dtheta's and dv's are continuously supplied to the digital processor 5 which regularly computes latitude, longitude, altitude, pitch, roll, heading, velocity east, velocity north, and velocity up. Using the six-degrees-of-freedom equations for the torpedo, the digital processor 5 computes estimates of side-slip angle, angle-of-attack, control-surface deflection angles, and propeller speed. These computations use navigation velocity, lever arms, and navigation turn-rates as inputs.

There are five external inputs which can be used as observations in a Kalman filter process: control-surface deflection angle (cross and up), propeller speed, and null velocity (cross track and up track). Of the five, the cross-track null-velocity observation, which requires no actual physical input is the most useful. The control-surface deflection angle observations could be eliminated with slight degradation in the failure detection capability.

The digital processor 5 regularly obtains corrections to the following quantities utilizing a Kalman filter process: position (3 coordinates), velocity (3 coordinates), attitude (3 coordinates), IMU instrument biases (6), torpedo propeller-speed scale factor (1), up-track and cross-track bias angles (2), and control-surface deflection-angle biases (2). Corrections to sea drift (2 coordinates) can also be made available.

The no-go is set if any estimate or observation exceeds a predetermined threshold level. Such a discrepancy would indicate a failure of some sort even though identification of the particular failure may not be possible. The predetermined threshold level should be some factor greater than one times the standard deviation of the estimate or observation.

The digital processor 5 detects guidance failures by exploiting the fact that a torpedo tends to move in the direction in which it is pointed (except for small angle-of-attack α and small side-slip angle β). Thus, neglecting α and β, any cross-body (y coordinate) acceleration $a_y$ implies a rotation rate $\omega_z$ about down-body (z coordinate).

$$\omega_z = \frac{a_y}{v} \tag{1}$$

where v is the forward (and total) velocity in the x direction. The acceleration $a_y$ is obtained from the y accelerometer in the IMU, corrected for gravity. The velocity v is obtained either from the propeller speed or from a duplicate navigation solution using the outputs from the three accelerometers, the x and y gyros, and equation (1) for $\omega_z$. Initial (launch) latitude, pitch, roll, and heading from north are used to correct for earth rate and gravity.

The angles α and β are typically on the order of several degrees which, although small, may not be small enough to ignore. Equation (1) revised to take into account α and β is as follows:

$$\omega_z = \frac{a_y + \beta a_x}{v} + \alpha \omega_x + \dot{\beta} \tag{2}$$

The additional terms required by equation (2) are $a_x$, $\omega_x$, α, β, and $\dot{\beta}$. The forward acceleration $a_x$ and the rotation rate about forward axis $\omega_x$ are available from the x accelerometer and x gyro respectively. The terms α, β, and $\dot{\beta}$ only need to be approximate and thus may be estimated using known coefficients (available from the torpedo manufacturer) which describe the torpedo dynamics.

Before describing the preferred embodiment, it is necessary to cover certain mathematical preliminaries. The coriolis acceleration can be ignored insofar as the CRDA embodiment is concerned, and consequently a non-rotating earth can be assumed in the material that follows.

It is convenient to refer to three frames of reference. The inertial (I) frame is fixed in space. The body (B) frame is fixed with respect to the torpedo body. The B frame origin translates from the I frame origin as the torpedo moves. The B frame rotates from the I frame as the torpedo rotates. The Euler angles which define the B frame with respect to the I frame (x, y, and z coordinate axes) are yaw (ψ) about the z axis, then pitch (θ) about the y axis, and then roll (φ) about the x axis.

The velocity (V) frame is rotated from the B frame as a function of α and β. The total velocity vector $\bar{v}$ of the torpedo lies along the x axis of the V frame.

Figure 2:
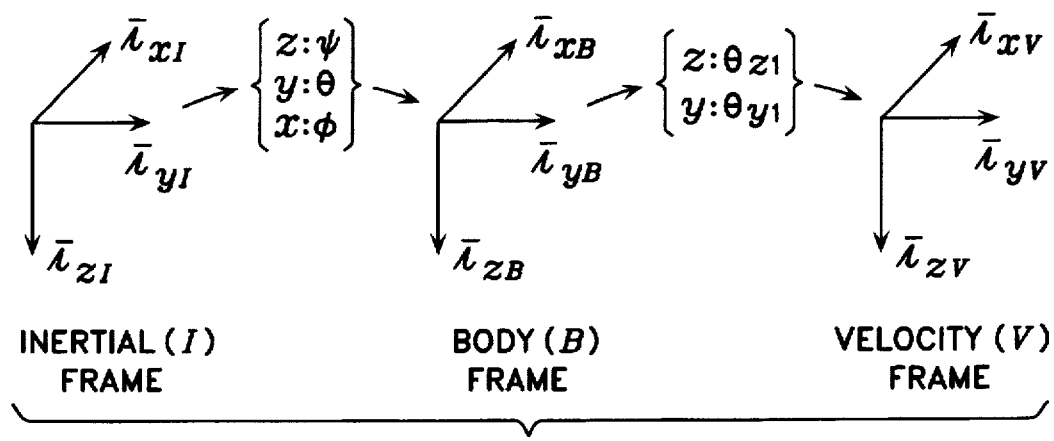
FIG. 2 illustrates the transformations from an inertial reference frame to a body reference frame to a velocity reference frame.

The V frame, with unit vectors $\bar{1}_{xV}$, $\bar{1}_{yV}$, and $\bar{1}_{zV}$, is obtained by rotating first from the B frame about the z axis and then about the y axis. The amounts of rotation $\theta_{z1}$ and $\theta_{y1}$ are chosen so that $\bar{1}_{xV}$ coincides with the direction of the velocity vector $\bar{v}$. The rotations are illustrated in FIG. 2.

The velocity vector $\bar{v}$ in B frame coordinates is given by $$\bar{V} = V_{xB}\bar{1}_{xB} + V_{yB}\bar{1}_{yB} + V_{zB}\bar{1}_{zB} \tag{3}$$

where unit vectors $\bar{1}_{xB}$, $\bar{1}_{yB}$, and $\bar{1}_{zB}$ are associated with the B frame.

The velocity vector $\bar{v}$ in V frame coordinates is given by $$\bar{V} = V_{xV}\bar{1}_{xV} + V_{yV}\bar{1}_{yV} + V_{zV}\bar{1}_{zV} \tag{4}$$

Thus, $$\begin{bmatrix} V_{xV} \\ V_{yV} \\ V_{zV} \end{bmatrix} = \begin{bmatrix} v \\ 0 \\ 0 \end{bmatrix} = [y:\theta_{y1}][[z:\theta_{z1}]] \begin{bmatrix} V_{xB} \\ V_{yB} \\ V_{zB} \end{bmatrix} \tag{5}$$

and $$\begin{bmatrix} v_{xB} \\ v_{yB} \\ v_{zB} \end{bmatrix} = [z;-\theta_{z1}] \, [[y;-\theta_{y1}] \begin{bmatrix} v \\ 0 \\ 0 \end{bmatrix} \quad (6)$$

$$\begin{bmatrix} v_{xB} \\ v_{yB} \\ v_{zB} \end{bmatrix} = \begin{bmatrix} c\theta_{y1}c\theta_{z1} & -s\theta_{z1} & s\theta_{y1}c\theta_{z1} \\ c\theta_{y1}s\theta_{z1} & c\theta_{z1} & s\theta_{y1}s\theta_{z1} \\ -s\theta_{y1} & 0 & c\theta_{y1} \end{bmatrix} \begin{bmatrix} v \\ 0 \\ 0 \end{bmatrix} \quad (7)$$

where s and c stand for sine and cosine respectively. It follows from equation (7) that $$\begin{bmatrix} v_{xB} \\ v_{yB} \\ v_{zB} \end{bmatrix} = \begin{bmatrix} c\theta_{y1}c\theta_{z1}v \\ c\theta_{y1}s\theta_{z1}v \\ -s\theta_{y1}v \end{bmatrix} \quad (8)$$

Since $$\beta = \arcsin[-v_{yB}/v] \quad (9)$$

and $$\alpha = \arcsin[v_{zB}/v] \quad (10)$$

then $$v_{yB} = -v\sin\beta \quad (11)$$

$$v_{zB} = v\sin\alpha$$

It follows from equation (8) that $$c\theta_{y1}s\theta_{z1} = -s\beta \quad (12)$$

$$-s\theta_{y1} = s\alpha$$

Thus, in general, $$\theta_{y1} = -\alpha \quad (13)$$

$$\theta_{z1} = \arcsin[-\sin\beta/\cos\alpha]$$

and for small $\alpha$, $$\theta_{y1} = -\alpha \quad (14)$$

$$\theta_{z1} = -\beta$$

Figure 3:
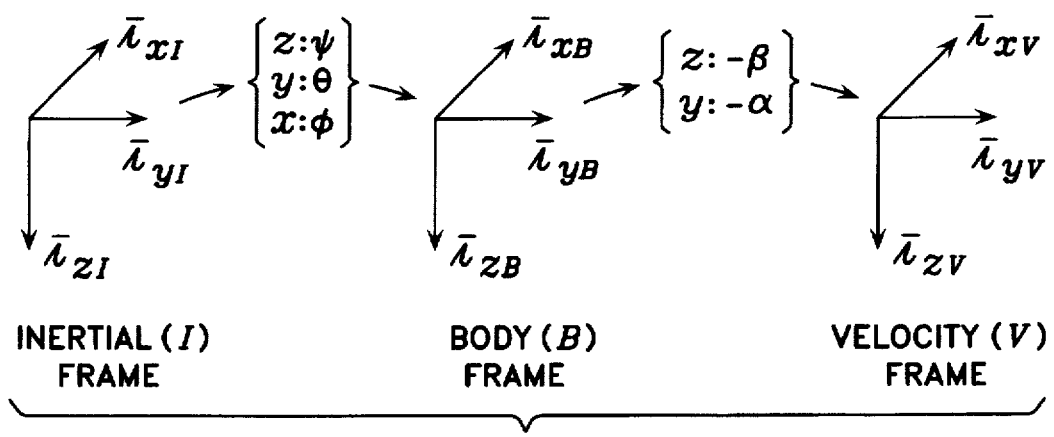
FIG. 3 illustrate the transformations from an inertial reference frame to a body reference frame to a velocity reference frame for small angles of attack.

For small $\alpha$, the transformations of FIG. 2 become the ones shown in FIG. 3.

It can be seen from FIG. 3 that the rotation matrix from the V frame to the B frame with small $\alpha$ and $\beta$ is $$[z;\beta][y;\alpha] = \begin{bmatrix} 1 & \beta & -\alpha \\ -\beta & 1 & 0 \\ \alpha & 0 & 1 \end{bmatrix} \quad (15)$$

The rotation matrix from the B frame to the V frame is $$[y;-\alpha][z;-\beta] = \begin{bmatrix} 1 & -\beta & \alpha \\ \beta & 1 & 0 \\ -\alpha & 0 & 1 \end{bmatrix} \quad (16)$$

The transformation of $\bar{\omega}_B$ from the V frame to the B frame is represented by $$\begin{bmatrix} \omega_{B_xB} \\ \omega_{B_yB} \\ \omega_{B_zB} \end{bmatrix} = \begin{bmatrix} 1 & \beta & -\alpha \\ -\beta & 1 & 0 \\ \alpha & 0 & 1 \end{bmatrix} \begin{bmatrix} \omega_{B_xV} \\ \omega_{B_yV} \\ \omega_{B_zV} \end{bmatrix} \quad (17)$$

The transformation of $\bar{\omega}_B$ from the B frame to the V frame is represented by $$\begin{bmatrix} \omega_{B_xV} \\ \omega_{B_yV} \\ \omega_{B_zV} \end{bmatrix} = \begin{bmatrix} 1 & -\beta & \alpha \\ \beta & 1 & 0 \\ -\alpha & 0 & 1 \end{bmatrix} \begin{bmatrix} \omega_{B_xB} \\ \omega_{B_yB} \\ \omega_{B_zB} \end{bmatrix} \quad (18)$$

From equations (17) and (18), $$\omega_{B_zB} = \omega_{B_zV} + \alpha\omega_{B_xV} \quad (19)$$

$$\omega_{B_xV} = \omega_{B_xB} - \beta\omega_{B_yB} + \alpha\omega_{B_zB}$$

Eliminating $\omega_{B_xV}$ from the two equations and dropping products of $\alpha$ and $\beta$, we obtain $$\omega_{B_zB} = \omega_{B_zV} + \alpha\omega_{B_xB} \quad (20)$$

The angular rate of the V frame in terms of the angular rate of the B frame is easily derived. From FIG. 3, $$\bar{\omega}_V = (-\dot\alpha)\bar{i}_{yV} + (-\dot\beta)\bar{i}_{zB} + \bar{\omega}_B \quad (21)$$

But $$\begin{bmatrix} \bar{i}_{xB} \\ \bar{i}_{yB} \\ \bar{i}_{zB} \end{bmatrix} = \begin{bmatrix} 1 & \beta & -\alpha \\ -\beta & 1 & 0 \\ \alpha & 0 & 1 \end{bmatrix} \begin{bmatrix} \bar{i}_{xV} \\ \bar{i}_{yV} \\ \bar{i}_{zV} \end{bmatrix} = \begin{bmatrix} \bar{i}_{xV} + \beta\bar{i}_{yV} - \alpha\bar{i}_{zV} \\ \bar{i}_{yV} - \beta\bar{i}_{xV} \\ \bar{i}_{zV} + \alpha\bar{i}_{xV} \end{bmatrix} \quad (22)$$

Thus, $$\bar{\omega}_V = (-\dot\alpha)\bar{i}_{yV} + (-\dot\beta)\bar{i}_{zV} + \alpha\bar{i}_{xV}) + \bar{\omega}_B \quad (23)$$

and $$\begin{bmatrix} \omega_{V_xV} \\ \omega_{V_yV} \\ \omega_{V_zV} \end{bmatrix} = \begin{bmatrix} \omega_{B_xV} \\ \omega_{B_yV} \\ \omega_{B_zV} \end{bmatrix} + \begin{bmatrix} -\dot\alpha\beta \\ -\dot\alpha \\ -\dot\beta \end{bmatrix} \quad (24)$$

which gives $$\omega_{B_zV} = \omega_{V_zV} = \dot\beta \quad (25)$$

Substituting this equation into (20), we obtain $$\omega_{B_zB} = \omega_{V_zV} + \alpha\omega_{B_xB} + \dot\beta \quad (26)$$

This equation expresses the z body rate ($\omega_{B_zB}$ in terms of quantities which are known or can be determined. The quantity ($\omega_{B_xB}$) will be available as the x-gyro output (corrected for earth rate). The quantity $\omega_{V_zV}$ can be obtained by applying the rule of zero cross-frame velocity to the V frame, as will be shown below. The quantities $\alpha$ and $\dot\beta$ can be determined approximately from known coefficients that appear in the torpedo dynamics equations, as will also be shown below.

Figure 4:
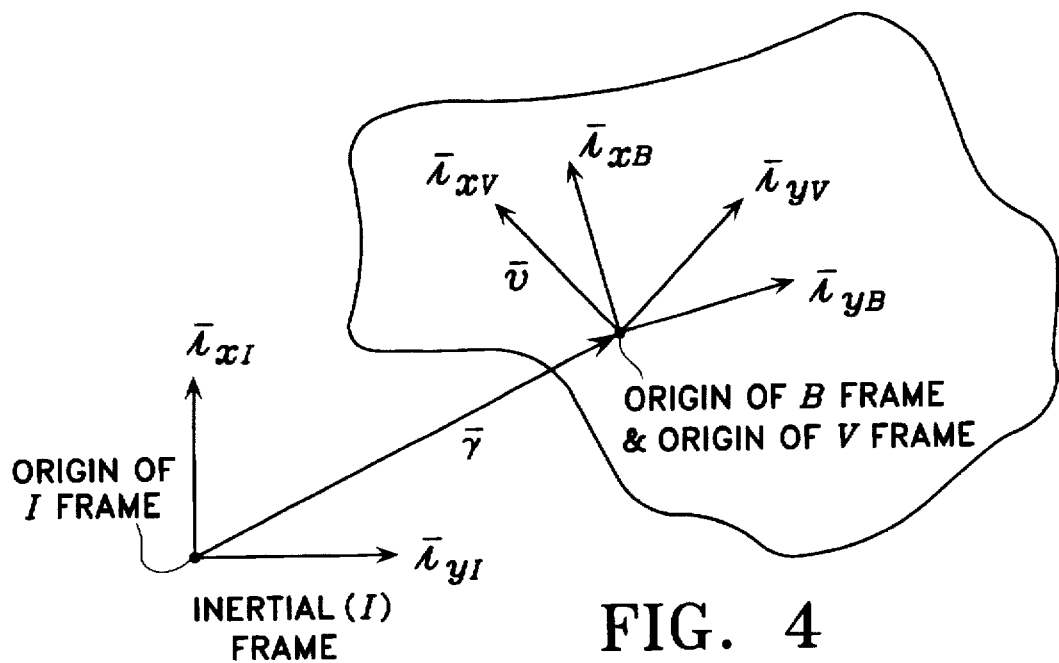
FIG. 4 illustrates the geometry of a body reference frame and a velocity reference frame with respect to an inertial reference frame.

The z component in the V frame of the angular rate of the V frame $\omega_{V_zV}$ can be obtained from the y component in the V frame of the V frame acceleration. The V frame origin coincides with the B frame origin (i.e. the V frame origin is attached to the body), but may rotate with respect to the body frame. Thus, the translational position, velocity, and acceleration of the V frame origin is the same as the translational position, velocity, and acceleration respectively of the B frame origin. The geometry is shown in FIG. 4.

The acceleration $\bar{a}$ of the origin of the V frame is related to the angular rate $\bar\omega_V$ of the V frame by the equation $$\bar{a} = \frac{d\bar{v}}{dt}\bigg]_V + \bar{\omega}\bar{v} \times \bar{v} \quad (27)$$

where $\bar{v}$ is the velocity of the origin of the B frame (and the V frame).

Writing the terms of the above equation in V frame coordinates, we obtain $$\bar{a} = a_{xV}\bar{i}_{xV} + a_{yV}\bar{i}_{yV} + a_{zV}\bar{i}_{zV} \quad (28)$$

$$\frac{d\bar{v}}{dt}\bigg]_V = \dot{v}_{xV}\bar{i}_{xV} + \dot{v}_{yV}\bar{i}_{yV} + \dot{v}_{zV}\bar{i}_{zV} \quad (29)$$

$$\bar{\omega}\bar{v} \times \bar{v} = \begin{bmatrix} \bar{i}_{xV} & \bar{i}_{yV} & \bar{i}_{zV} \\ \omega_{xV} & \omega_{yV} & \omega_{zV} \\ V_{xV} & V_{yV} & V_{zV} \end{bmatrix} \quad (30)$$

But by definition of the V frame, $$V_{yV} = V_{zV} = 0$$

$$\dot{V}_{yV} = \dot{V}_{zV} = 0 \quad (31)$$

Combining equations (28), (29), (30), and (31), we obtain $$a_{xV} = \dot{V}_{xV}$$

$$a_{yV} = V_{xV}\omega_{zV} \quad (32)$$

It follows that $$\omega_{yV} = \frac{-a_{zV}}{V_{xV}} \quad (33)$$

$$\omega_{zV} = \frac{a_{yV}}{V_{xV}}$$

The transformation of a from the B frame to the V frame for small $\alpha$ (see equation (16)) is given by $$\begin{bmatrix} a_{xV} \\ a_{yV} \\ a_{zV} \end{bmatrix} = \begin{bmatrix} 1 & -\beta & \alpha \\ \beta & 1 & 0 \\ -\alpha & 0 & 1 \end{bmatrix} \begin{bmatrix} a_{xB} \\ a_{yB} \\ a_{zB} \end{bmatrix} = \begin{bmatrix} a_{xB} - \beta a_{yB} + \alpha a_{zB} \\ \beta a_{xB} + a_{yB} \\ -\alpha a_{xB} + a_{zB} \end{bmatrix} \quad (34)$$

Combining equations (33) and (34), we obtain $$\omega_{yV} = \frac{-a_{zB} + \alpha a_{xB}}{V_{xV}} \quad (35)$$

$$\omega_{zV} = \frac{a_{yB} + \beta a_{xB}}{V_{xV}}$$

Substituting the second of the above equations in equation (26), we obtain $$\omega_{B_{zB}} = \frac{a_{yB} + \beta a_{xB}}{V_{xV}} + \alpha \omega_{B_{xB}} + \dot{\beta} \quad (36)$$

This equation gives the desired body rate $\omega_{B_{zB}}$ in terms of x and y body acceleration (which are available from accelerometers) and x body rate (which is available from the x gyro). Estimates of $\alpha$, $\beta$, and $\dot{\beta}$ can be obtained from the torpedo dynamics.

Figure 5:
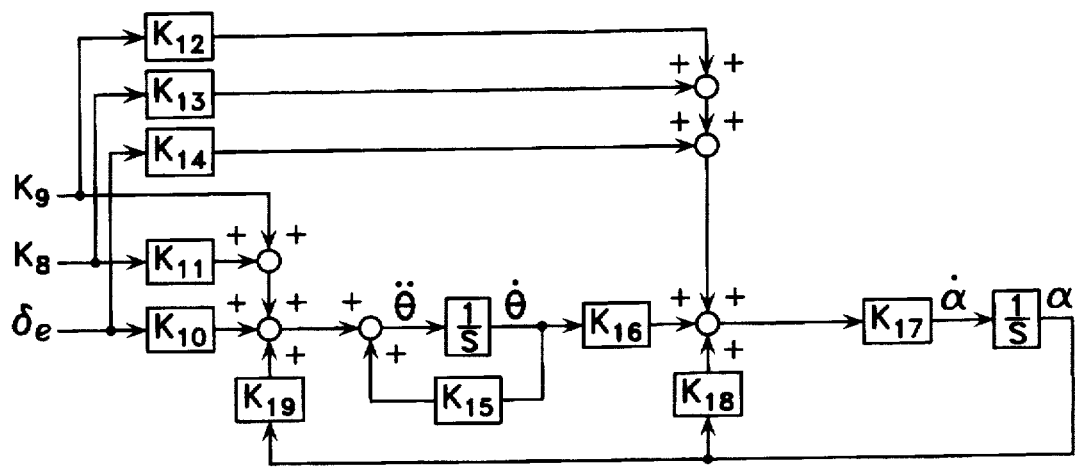
FIG. 5 shows a simplified second-order model for a torpedo relating angle of attack and pitch to control surface elevator angle.
Figure 6:
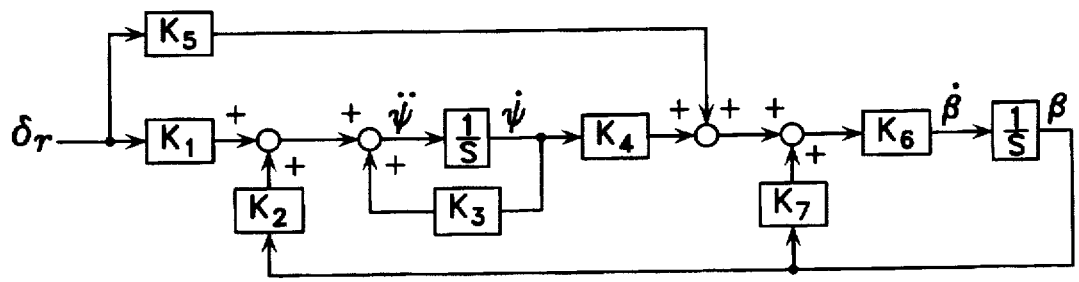
FIG. 6 shows a simplified second-order model for a torpedo relating side-slip angle and yaw to control surface rudder angle.

A simplified second-order model relating angle of attack $\beta$ and pitch $\theta$ to control surface elevator angle $\delta_e$ is shown in FIG. 5. A simplified second-order model relating side-slip angle $\beta$ and yaw $\psi$ to control surface rudder angle $\delta_r$ is shown in FIG. 6. The two loops are uncoupled. Among the assumptions are (1) all angles (including the roll angle $\phi$) are small and (2) the velocity v is constant. The coefficients $K_1, \ldots, K_{19}$ are, for a given torpedo design, known constants or known functions of velocity v.

With $\delta_r$ held at zero, the yaw axis settles when $\psi$, $\dot{\psi}$, $\beta$, and $\dot{\beta}$ are all equal to zero. Thus, for a straight swim the side-slip angle is zero. In the case of the pitch axis, a must be equal to a non-zero trim angle $\alpha_{trim}$ and $\delta_e$ must be non-zero if $\theta$, $\dot{\theta}$, and $\dot{\alpha}$ are all to be equal to zero.

$$\dot{\theta} = 0$$

$$d\dot{\theta}/dt = 0 = K_{10}\delta_e + K_8 K_{11} + K_9 + K_{19}\alpha_{trim} \quad (37)$$

$$\dot{\alpha} = 0 = K_9 K_{12} + K_8 K_{13} + \delta_e K_{14} + K_{18}\alpha_{trim}$$

Solving the above equations for $\alpha_{trim}$, we obtain $$\alpha_{trim} = \frac{\begin{vmatrix} (-K_9 K_{12} - K_8 K_{13})K_{14} \\ (-K_8 K_{11} - K_9)K_{10} \end{vmatrix}}{\begin{vmatrix} K_{18} & K_{14} \\ K_{19} & K_{10} \end{vmatrix}} = K_\alpha(v) \quad (38)$$

Thus, to produce a straight swim in a vertical plane, a trim angle $\alpha_{trim}$ is required. Since the K's are known constants or known functions of v, $\alpha_{trim}$ is considered known as some function $K_\alpha(v)$ of v.

With $\delta_r$ held constant at some non-zero value $\delta_{ro}$, the yaw axis steady-state response corresponds to $\dot{\psi}_{SS}$ and $\dot{\beta}_{SS}$ being equal to zero and $\ddot{\psi}_{SS}$ and $\beta_{SS}$ being equal to constants.

The following two equations can be solved for $\dot{\psi}_{SS}$ and $\beta_{SS}$.

$$d^2\psi_{SS}/dt^2 = 0 = K_1\delta_{ro} + K_3 d\psi_{SS}/dt + K_2\beta_{SS}$$

$$d\beta_{SS}/dt = 0 = K_5\delta_{ro} + K_4 d\psi_{SS}/dt + K_7\beta_{SS} \quad (39)$$

Eliminating $\delta_{ro}$ gives an expression for $\beta_{SS}$ as a function of $\dot{\psi}_{SS}$.

$$\beta_{SS} = \frac{K_3 K_5 - K_4 K_1}{-K_2 K_5 + K_7 K_9} d\psi_{SS}/dt = K_\beta(v)d\psi_{SS}/dt \quad (40)$$

Thus, if the yaw rate $\dot{\psi}$ in a constant turn is known, the side-slip angle $\beta$ is known since the K's are either known constants or known functions of velocity v and may be lumped into some function $K_\beta(v)$ of v.

Figure 7:
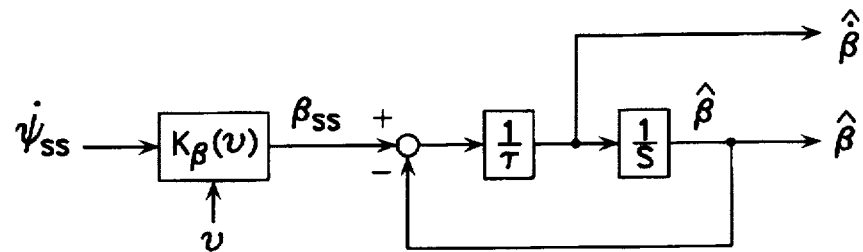
FIG. 7 shows a means for obtaining estimates of side-slip angle and time rate-of-change of side-slip angle.
Figure 8:
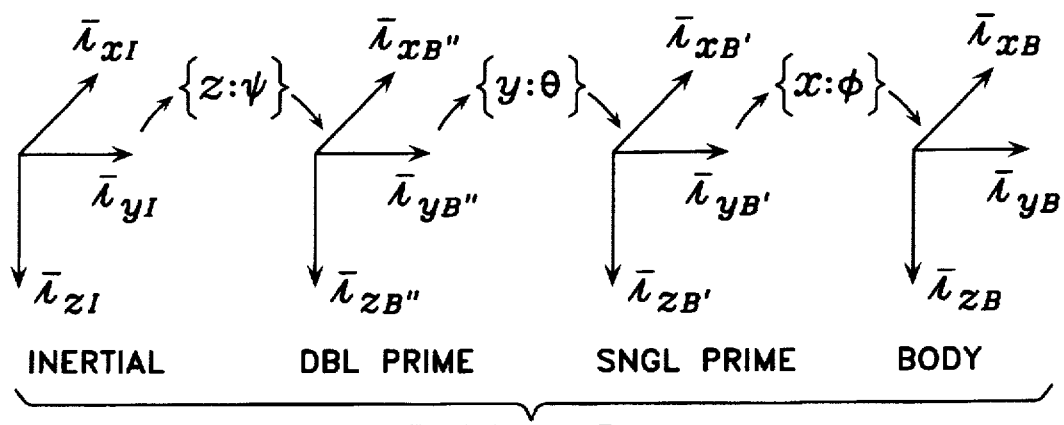
FIG. 8 shows the intermediate reference frames involved in a transformation from an inertial reference frame to a body reference frame.

An estimate of the side-slip angle $\beta$ can be obtained by assuming it is approaching $\beta_{SS}$ with some time constant $\tau$ (on the order of one second). The method is illustrated in FIG. 7 which shows how estimates $\hat{\beta}_{est}$ and $\hat{\dot{\beta}}_{est}$ are obtained from an input $\dot{\psi}_{SS}$. (Estimates in the figures are denoted by hats placed over the parameters.) An estimate of $\dot{\psi}_{SS}$ can be obtained in the following way. First we need a relationship between $\dot{\psi}$ and $\omega_{B_{zB}}$. FIG. 2 is expanded in FIG. 8 to show intermediate frames. From FIG. 8, $$\bar{\omega}_B = \dot{\phi}\bar{i}_{yB'} + \dot{\psi}\bar{i}_{zB''} \quad (41)$$

But $$\begin{bmatrix} \bar{i}_{xB'} \\ \bar{i}_{yB'} \\ \bar{i}_{zB'} \end{bmatrix} = [\gamma: -\theta] \begin{bmatrix} \bar{i}_{xB} \\ \bar{i}_{yB} \\ \bar{i}_{zB} \end{bmatrix} = \quad (42)$$

-continued $$\begin{bmatrix} c\theta & 0 & s\theta \\ 0 & 1 & 0 \\ -s\theta & 0 & c\theta \end{bmatrix} \begin{bmatrix} \overline{i_{xB'}} \\ \overline{i_{yB'}} \\ \overline{i_{zB'}} \end{bmatrix} = \begin{bmatrix} c\theta\overline{i_{xB'}} + s\theta\overline{i_{zB'}} \\ \overline{i_{yB'}} \\ -s\theta\overline{i_{xB'}} + c\theta\overline{i_{zB'}} \end{bmatrix}$$

and $$\begin{bmatrix} \overline{i_{xB''}} \\ \overline{i_{yB''}} \\ \overline{i_{zB''}} \end{bmatrix} = [x \cdot -\phi] \begin{bmatrix} \overline{i_{xB}} \\ \overline{i_{yB}} \\ \overline{i_{zB}} \end{bmatrix} = \tag{43}$$

$$\begin{bmatrix} 1 & 0 & 0 \\ 0 & c\phi & -s\phi \\ 0 & s\phi & c\phi \end{bmatrix} \begin{bmatrix} \overline{i_{xB}} \\ \overline{i_{yB}} \\ \overline{i_{zB}} \end{bmatrix} = \begin{bmatrix} \overline{i_{xB}} \\ c\phi\overline{i_{yB}} - s\phi\overline{i_{zB}} \\ s\phi\overline{i_{yB}} + c\phi\overline{i_{zB}} \end{bmatrix}$$

Combining equations (41), (42) and (43), we obtain $$\overline{\omega}_B = \dot{\phi}\overline{i_{xB}} + \dot{\theta}(c\phi\overline{i_{yB}} - s\phi\overline{i_{zB}}) + \dot{\psi}(-s\theta\overline{i_{xB}} + c\theta\overline{i_{zB'}}) \tag{44}$$

$$\overline{\omega}_B = \dot{\phi}\overline{i_{xB}} + \dot{\theta}(c\phi\overline{i_{yB}} - s\phi\overline{i_{zB}}) + \dot{\psi}[-s\theta\overline{i_{xB}} + c\theta(s\phi\overline{i_{yB}} + c\phi\overline{i_{zB}})] \tag{45}$$

$$\begin{bmatrix} \omega_{B_{xB}} \\ \omega_{B_{yB}} \\ \omega_{B_{zB}} \end{bmatrix} = \begin{bmatrix} 1 & 0 & -s\theta \\ 0 & c\phi & c\theta s\phi \\ 0 & -s\phi & c\theta c\phi \end{bmatrix} \begin{bmatrix} \dot{\phi} \\ \dot{\theta} \\ \dot{\psi} \end{bmatrix} \tag{46}$$

For small angles, $$\omega_{B_{zB}} = \dot{\phi}\theta + \dot{\psi} \tag{47}$$

and if $\dot{\phi}\theta$ is small, $$\dot{\psi} = \omega_{B_{zB}} \tag{48}$$

If follows that $$\dot{\psi}_{SS} = (\omega_{B_{zB}})_{SS} \tag{49}$$

Evaluating equation (36) in steady state with $\dot{\beta}=0$, we obtain $$\dot{\psi}_{SS} = (\omega_{B_{zB}})_{SS} = \frac{a_{yB_{SS}} + \beta_{SS}a_{xB_{SS}}}{V_x V_{SS}} + \alpha_{SS}(\omega_{B_{xB}})_{SS} \tag{50}$$

Based on this equation, a reasonable estimate for $\dot{\psi}_{SS}$ is given by $$(\dot{\psi}_{SS})_{est} = \frac{a_{yB} + \beta_{est}a_{xB}}{V_x} + \alpha_{est}\omega_{B_{xB}} \tag{51}$$

Figure 9:
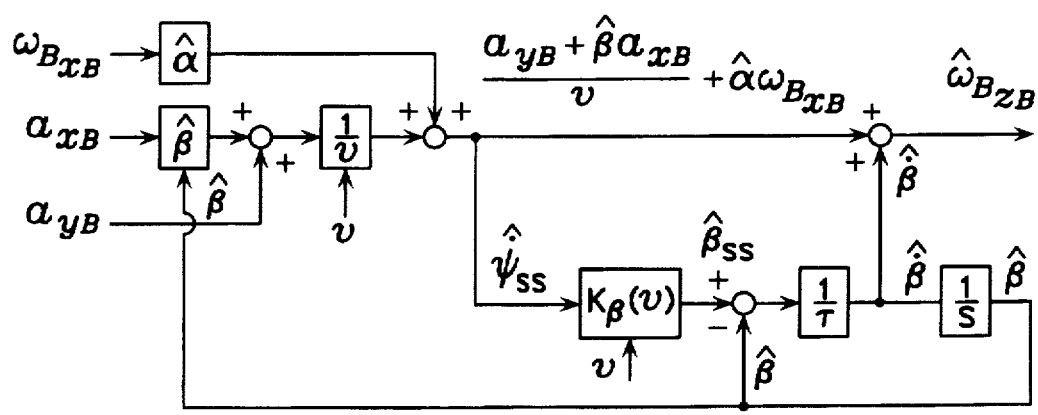
FIG. 9 shows a means for obtaining estimates of the z-axis angular velocity of the torpedo.

Using equation (51) to supply $(\dot{\psi}_{SS})_{est}$ in FIG. 7 leads to FIG. 9. The mechanization shown in FIG. 9 has the property that in a steady-state turn or in straight swim, both $\psi$ and $\dot{\psi}$ are correct. During the transition between a straight and a steady-state turn, there will be some errors, as discussed below.

With regard to a gravity estimate, a constant roll of one degree would cause a cross-body component of gravity of 0.17 m/s². At a speed of 15 m/s, such a component of gravity would indicate an estimated turn rate of 0.17/15 rad/s or 0.65 degrees/s. Since this rate would be constant, the estimated heading would continuously change and would reach 180 degrees in less than 5 minutes. Thus, the preferred embodiment of the CRDA includes a gravity estimate.

If earth rate is not compensated, then a 10-degree/hour level earth rate would produce a roll of one degree in six minutes. Thus, the preferred embodiment should also include an earth-rate estimate.

Coriolis acceleration is given by $2\overline{\omega} \times \overline{v}$ where $\omega$ is transport rate plus earth rate and v is torpedo speed. With $\omega=10$ degrees/hour and $v=15$ m/s, coriolis acceleration is only 0.00144 m/s² which is negligible in the context of the problem being solved. Thus, the preferred embodiment need not include a coriolis acceleration estimate.

Figure 10:
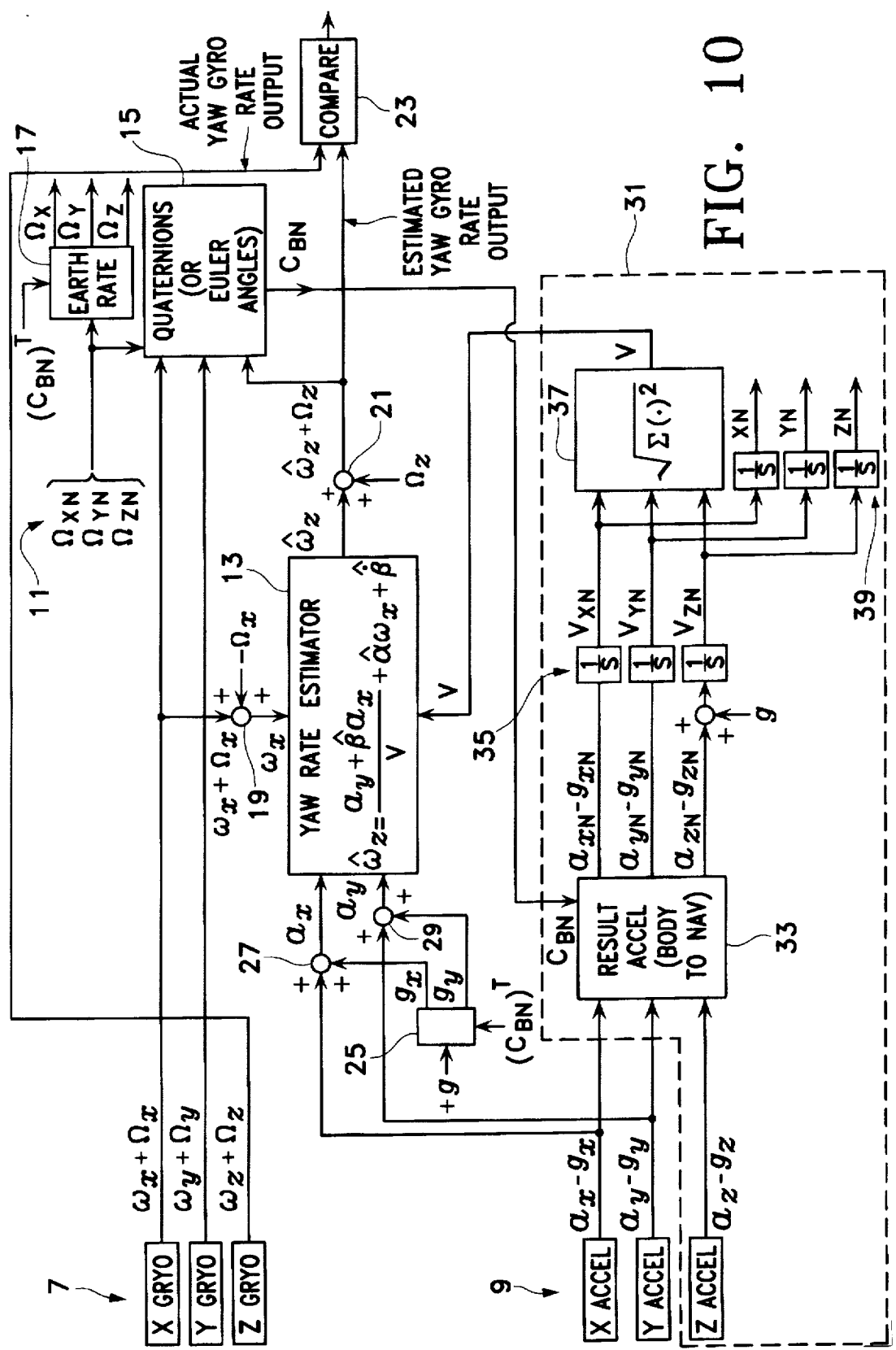
FIG. 10 is a flow diagram of the software segments that control the operations of the circular-run detection apparatus.

The operations performed by the digital processor 5 are indicated in FIG. 10. The gyros 7 and the accelerometers 9 of the IMU 3 are represented by the boxes at the left in FIG. 10. The gyro outputs are the sums of the B frame angular rotation rate components $\omega_x$, $\omega_y$, and $\omega_z$ and the earth angular rotation rate components $\Omega_x$, $\Omega_y$, and $\Omega_z$. The earth rate components in the N frame $\Omega_{xN}$, $\Omega_{yN}$, and $\Omega_{zN}$ 11 are constants for a torpedo run. The N-frame earth-rate components 11 together with the x and y gyro outputs and an estimate of the z component supplied by the yaw rate estimator 13 feed into box 15 for conversion into the transformation matrix $C_{BN}$ for transforming B-frame vector components to N-frame components. The N frame is the navigation reference frame.

The N-frame earth-rate components are transformed in box 17 to B-frame coordinates using the transpose of $C_{BN}$. The B-frame earth-rate components $\Omega_x$ and $\Omega_z$ from box 17 are used respectively in summer 19 to obtain an $\omega_x$ input to the yaw rate estimator 13 and in summer 21 to obtain an $(\omega_z)_{est}+\Omega_z$ input to box 15 and also to box 23 for comparison with the $\omega_z+\Omega_z$ quantity supplied by the z gyro.

The accelerometers 9 supply the B frame components of the difference between the acceleration of the B frame with respect to the N frame and gravity. Gravity is transformed in box 25 using the transpose of $C_{BN}$ to B-frame components, and the x and y components are combined respectively with the x and y accelerometer outputs in summers 27 and 29 to obtain $a_x$ and $a_y$ inputs to yaw rate estimator 13.

The three accelerometer outputs feed into the velocity estimator 31 which uses $C_{BN}$ to transform the B-frame components to N-frame components in box 33. The N-frame components are integrated in integrators 35 to obtain N-frame components of velocity and the velocity magnitude is computed in box 37. The velocity magnitude is supplied as another input to the yaw rate estimator 13.

The N-frame components of the position of the torpedo are obtained by integrating the N-frame components of velocity in integrators 39.

The output of box 23 provides a GO/NO-GO signal if the difference in the two input signals exceeds a predetermined threshold. If the two inputs differ significantly, it is an indication that the torpedo may be in a circular run and should be destroyed.

Figure 11:
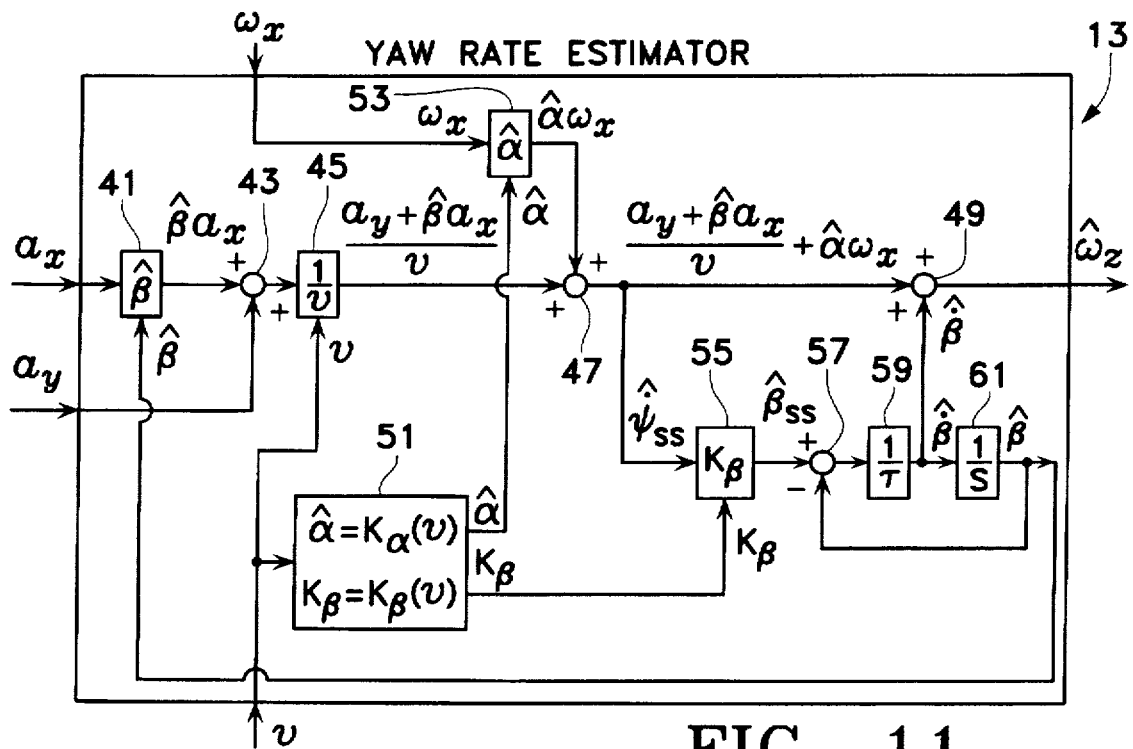
FIG. 11 is a flow diagram of the software segment that is executed by the circular-run detection apparatus in computing estimates of the z-axis angular velocity of a torpedo.

The yaw rate estimator 13 is shown in more detail in FIG. 11. Estimates are indicated in the figure by hats over the quantities. The acceleration $a_x$ is multiplied by an estimate $\beta_{est}$ of $\beta$ in box 41, added to $a_y$ in summer 43, multiplied by 1/v in box 45, added to $\alpha_{est}\omega_x$ in summer 47, and added to an estimate $\dot{\beta}_{est}$ of $\dot{\beta}$ in summer 49, in accordance with equation (36). The estimate $\alpha_{est}$ of $\alpha$ is obtained in box 51 by evaluating the function $K_\alpha(v)$ in accordance with equation (38). The product $\alpha_{est}\omega_x$ is formed in box 53. The estimate $(\dot{\psi}_{SS})_{est}$ corresponds to the output of summer 47, in accordance with equation (51). This estimate is multiplied by $K_\beta(v)$ in box 55 to obtain an estimate $(\beta_{SS})_{est}$ of $\beta_{SS}$, in accordance with equation (40). The $K_\beta(v)$ term is evaluated in box 51. The combination of the summer 57 and boxes 59 and 61 provide an estimate $\dot{\beta}_{est}$ of $\dot{\beta}$ for use in box 49 and an estimate $\beta_{est}$ of $\beta$ for use in box 41.

A simplified simulation of the yaw axis only was performed using an HP9836 computer. The yaw axis model of FIG. 6 was used to describe the true torpedo dynamics. The following coefficients were used: $K_1=1.0, K_2=-0.2, K_3=-1.0, K_4=0.5, K_5=0.1, K_6=1.0,$ and $K_7=-2.0$.

The commanded rudder angle $\delta_r$ was a step of correct size to produce a steady-state turn rate of 10 degrees/s.

Using the exact resulting body angular rate and acceleration, as derived herein, the accelerometer and gyro outputs were determined. Feeding these values into the equations of FIGS. 10 and 11 produced the estimates $\psi_{est}$ and $\dot\psi_{est}$. These estimates were compared with the true values for $\psi$ and $\dot\psi$. The angle error $\psi_{est}-\psi$ and the rate error $\dot\psi_{est}-\dot\psi$ were both zero during straight swim or constant turn. During the transition, which lasted about one second, the peak angle error was about one degree and the peak rate error was about one degree/s. It is believed that this method would produce worst case errors of about two degrees and two degrees/s.

The torpedo dynamics equations (37)–(40) reflected in FIGS. 5 and 6 assume that the origin of the B frame is located at the center of gravity (C.G.) of the torpedo. That is, $\beta$ is defined at the C.G. If the B-frame origin is located at some other point in the body, the equations have the same form but with a transformed set of coefficients $K'_1, \ldots K'_{19}$.

Figure 12:
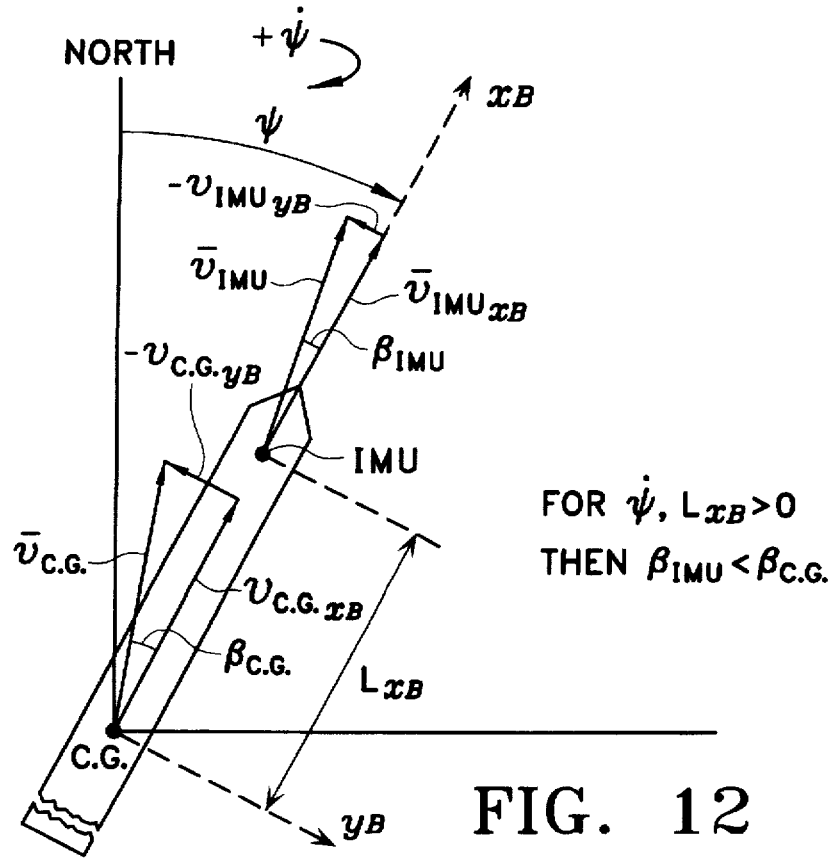
FIG. 12 illustrates the geometry associated with an inertial measurement unit that is displaced from the center of gravity of the torpedo.

There is an advantage to moving the B-frame origin from the C.G. to the IMU location. The value of $\beta$ will be smaller, thus making it easier to estimate. The derivation which follows shows why $\beta$ will be smaller. FIG. 12 shows the geometry.

As before, let the origin of the B frame be at the C.G. and let the B frame be oriented with its x axis in the forward body direction. Let the IMU be located at lever arm $\bar{L}$ from the C.G. Consider only x-y plane motion. The velocity of the IMU is given by $$\overline{V_{IMU}}=\overline{V_{C.G.}}+(\overline{\omega_B}\times\bar{L}) \quad (52)$$

Taking components in the B frame and assuming $$\omega_{B_{xB}}=\omega_{B_{yB}}=L_{yB}=L_{zB}=0 \quad (53)$$

we have $$V_{IMU_{xB}}=V_{C.G._{xB}}$$

$$V_{IMU_{yB}}=V_{C.G._{yB}}+L_{xB}\omega_{B_{zB}} \quad (54)$$

But by definition $$\beta_{C.G.}=\arctan[-V_{C.G._{yB}}/V_{C.G._{xB}}] \quad (55)$$

$$\beta_{IMU}=\arctan[-V_{IMU_{yB}}/V_{IMU_{xB}}]$$

Substituting equation (54) into equation (55), we obtain $$\beta_{IMU} = \arctan\left[\frac{-V_{C.G._{yB}}-L_{xB}\omega_{B_{zB}}}{V_{C.G._{xB}}}\right] = \arctan\left[\tan\beta_{C.G.}-\frac{L_{xB}\omega_{B_{zB}}}{|V_{C.G.}|\cos\beta_{C.G.}}\right] \quad (56)$$

where we have used $$V_{C.G._{xB}}=|V_{C.G.}|\cos\beta_{C.G.} \quad (57)$$

For a clockwise turn as viewed from the top, $\omega_{B_{zB}}$ is positive. If the IMU is forward of the C.G., then $L_{xB}$ is also positive. Thus, the second of equations (56) gives a $\beta_{IMU}$ that is less positive than $\beta_{C.G.}$. But for positive $\omega_{B_{zB}}$, it turns out that $\beta_{C.G.}$ itself is also positive. Thus, for the range $$L_{xB}\omega_{B_{zB}}<\tan\beta_{C.G.} \quad (58)$$

we will have $$0<\beta_{IMU}<\beta_{C.G.} \quad (59)$$

For the situation illustrated in FIG. 12:

$$\omega_{B_{zB}}=10°/s$$

$$L_{xB}=2.16\text{ m} \quad (60)$$

$$\beta_{C.G.}=3°$$

$$|V_B|=15.24\text{ m/s}$$

From the second of equations (56), $\beta_{IMU}=1.58°$ which is about one half of $\beta_{C.G.}$.

What is claimed is:

1. Apparatus for use on a mobile platform in association with a guidance system, the purpose of the apparatus being to recognize guidance failures, the attitude of the platform being defined as a first rotation of an inertial Cartesian coordinate system by a yaw angle about the z-axis, a second rotation by a pitch angle about the y-axis, and a third rotation by a roll angle about the x-axis, the rotated coordinate system being called the body frame of reference (BFR), the x-axis approximating the direction of motion of the platform, the apparatus comprising:

an inertial measurement unit (IMU) comprising (1) a device for measuring the BFR z-component of the angular velocity of the platform relative to an inertial frame of reference and (2) a device for measuring the BFR y-component of the acceleration of the platform relative to an inertial frame of reference;

a digital processor which estimates the velocity of the platform and the BFR z-component of the angular velocity of the platform with respect to an inertial frame of reference, the estimated BFR z-component of angular velocity being obtained by using the measured BFR y-component of acceleration and the estimated velocity, the digital processor indicating that a guidance failure has occurred if the difference between the measured and the estimated BFR z-component of angular velocity exceeds a threshold level.

2. The apparatus of claim 1 wherein the velocity of the platform is in the direction of the x-axis of a velocity frame of reference, the velocity frame being defined by a rotation of the BFR by a side-slip angle about the z-axis, the IMU further comprising a device for measuring the BFR x-component of the acceleration of the platform relative to an inertial frame of reference, the digital processor estimating the side-slip angle, the digital processor also using the measured BFR x-component of the acceleration of the platform and the estimated side-slip angle to estimate the BFR z-component of the angular velocity of the platform.

3. The apparatus of claim 2 wherein the digital processor estimates the side-slip angular velocity, the digital processor also using the estimated side-slip angular velocity to estimate the BFR z-component of the angular velocity of the platform.

4. The apparatus of claim 3 wherein the platform employs a rudder having an adjustable deflection angle to cause a change in the yaw angle, the digital processor estimating the side-slip angular velocity from the side-slip angle obtained from the steady-state side-slip angle for an arbitrary rudder deflection angle, the relationship between the side-slip angle and its steady-state value being that the side-slip angle approaches its steady-state value exponentially with a predetermined time constant.

5. The apparatus of claim 4 wherein the digital processor uses the steady-state value of the yaw angular velocity to obtain the steady-state value of the side-slip angle by means of a functional relationship between the steady-state value of the yaw angular velocity and the steady-state value of the side-slip angle, the functional relationship having been derived from the equations of motion for the platform.

6. The apparatus of claim 3 wherein the platform employs a rudder having an adjustable deflection angle to cause a change in the yaw angle, the digital processor using the rudder deflection angle and the equations of motion for the platform to estimate the side-slip angular velocity.

7. The apparatus of claim 2 wherein the velocity frame is further defined by a rotation by an angle-of-attack about the y-axis, the IMU flier comprising a device for measuring the BFR x-component of the angular velocity of the platform relative to an inertial frame of reference, the digital processor estimating the angle-of-attack, the digital processor also using the measured BFR x-component of the angular velocity of the platform and the estimated angle-of-attack to estimate the BFR z-component of the angular velocity of the platform.

8. The apparatus of claim 7 wherein the digital processor estimates the side-slip angular velocity, the digital processor also using the side-slip angular velocity to estimate the BFR z-component of the angular velocity of the platform.

9. The apparatus of claim 7 wherein the digital processor uses the steady-state value of the angle-of-attack for a straight-line platform path as the estimate of the angle of attack, the steady-state value of the angle-of-attack having been determined from the equations of motion for the platform.

10. The apparatus of claim 7 wherein the platform employs an elevator having an adjustable deflection angle to cause a change in the pitch angle, the digital processor using the steady-state value of the angle-of-attack for a straight-line platform path as the estimate of the angle-of-attack, the steady-state value of the angle-of-attack being determined using the elevator deflection angle for a straight-line path and the equations of motion for the platform.

11. The apparatus of claim 2 wherein the platform employs a rudder having an adjustable deflection angle to cause a change in the yaw angle, the digital processor estimating the side-slip angle from its steady-state value for an arbitrary rudder deflection angle, the relationship between the side-slip angle and its steady-state value being that the side-slip angle approaches its steady-state value exponentially with a predetermined time constant.

12. The apparatus of claim 11 wherein the digital processor uses the steady-state value of the yaw angular velocity to obtain the steady-state value of the side-slip angle by means of a functional relationship between the steady-state value of the yaw angular velocity and the steady-state value of the side-slip angle, the functional relationship having been derived from the equations of motion for the platform.

13. The apparatus of claim 2 wherein the platform employs a rudder having an adjustable deflection angle to cause a change in the yaw angle, the digital processor using the rudder deflection angle and the equations of motion for the platform to estimate the side-slip angle.

14. The apparatus of claim 1 wherein the platform is propelled by a mechanism which runs at one or more speeds, the velocity of the platform being estimated from the speed of the mechanism.

15. The apparatus of claim 1 wherein the IMU further comprises devices for measuring the BFR x-component and the BFR z-component of the acceleration of the platform relative to an inertial frame of reference, the digital processor using the measurements of the three components of the acceleration of the platform to estimate the velocity of the platform.

16. The apparatus of claim 1 wherein the IMU further comprises devices for measuring the BFR x-component and the BFR y-component of the angular velocity of the platform with respect to an inertial frame of reference, the digital processor computing the transformation matrix from the BFR to a navigation frame of reference using the measured BFR x-component, the measured BFR y-component of platform angular velocity, and the estimated z-component of platform angular velocity.

17. Apparatus for use on a mobile platform in association with a guidance system, the purpose of the apparatus being to recognize guidance failures, the attitude of the platform being defined as a first rotation of an inertial Cartesian coordinate system by a yaw angle about the z-axis, a second rotation by a pitch angle about the y-axis, and a third rotation by a roll angle about the x-axis, the rotated coordinate system being called the body frame of reference (BFR), the x-axis approximating the direction of motion of the platform, the platform providing a plurality of measurements over time of the BFR z-component of the angular velocity of the platform relative to an inertial frame of reference and the BFR y-component of the acceleration of the platform relative to an inertial frame of reference, the platform providing one or more values over time of a quantity from which the velocity of the platform can be estimated, the apparatus comprising:

a digital processor which estimates the velocity and the BFR z-component of the angular velocity of the platform with respect to an inertial frame of reference, the estimated BFR z-component of angular velocity being obtained by using the measured BFR y-component of acceleration and the estimated velocity, the digital processor indicating that a guidance failure has occurred if the difference between the measured and the estimated BFR z-component of angular velocity exceeds a threshold level.

18. The apparatus of claim 17 wherein the velocity of the platform is in the direction of the x-axis of a velocity frame of reference, the velocity frame being defined by a rotation of the BFR by a side-slip angle about the z-axis, the platform providing a plurality of measurements over time of the BFR x-component of the acceleration of the platform relative to an inertial frame of reference, the digital processor estimating the side-slip angle, the digital processor also using the measured BFR x-component of the acceleration of the platform and the estimated side-slip angle to estimate the BFR z-component of the angular velocity of the platform.

19. The apparatus of claim 18 wherein the digital processor estimates the side-slip angular velocity, the digital processor also using the estimated side-slip angular velocity to estimate the BFR z-component of the angular velocity of the platform.

20. The apparatus of claim 19 wherein the platform employs a rudder having an adjustable deflection angle to cause a change in the yaw angle, the digital processor estimating the side-slip angular velocity from the side-slip angle obtained from the steady-state side-slip angle for an arbitrary rudder deflection angle, the relationship between the side-slip angle and its steady-state value being that the side-slip angle approaches its steady-state value exponentially with a predetermined time constant.

21. The apparatus of claim 20 wherein the digital processor uses the steady-state value of the yaw angular velocity to obtain the steady-state value of the side-slip angle by means of a functional relationship between the steady-state value of the yaw angular velocity and the steady-state value of the side-slip angle, the functional relationship having been derived from the equations of motion for the platform.

22. The apparatus of claim 19 wherein the platform employs a rudder having an adjustable deflection angle to cause a change in the yaw angle, the platform providing a plurality of values over time for the values of the rudder deflection angle, the digital processor using the rudder deflection angle and the equations of motion for the platform to estimate the side-slip angular velocity.

23. The apparatus of claim 18 wherein the velocity frame is further defined by a rotation by an angle-of-attack about the y-axis, the platform providing a plurality of measurements over time of the BFR x-component of the angular velocity of the platform relative to an inertial frame of reference, the digital processor estimating the angle-of-attack, the digital processor also using the measured BFR x-component of the angular velocity of the platform and the estimated angle-of-attack to estimate the BFR z-component of the angular velocity of the platform.

24. The apparatus of claim 23 wherein the digital processor estimates the side-slip angular velocity, the digital processor also using the estimated side-slip angular velocity to estimate the BFR z-component of the angular velocity of the platform.

25. The apparatus of claim 23 wherein the digital processor uses the steady-state value of the angle-of-attack for a straight-line platform path as the estimate of the angle of attack, the steady-state value of the angle-of-attack having been determined from the equations of motion for the platform.

26. The apparatus of claim 23 wherein the platform employs an elevator having an adjustable deflection angle to cause a change in the pitch angle, the platform providing a plurality of values over time for the values of the elevator deflection angle, the digital processor using the steady-state value of the angle-of-attack for a straight-line platform path as the estimate of the angle-of-attack, the steady-state value of the angle-of-attack being determined using the elevator deflection angle for a straight-line path and the equations of motion for the platform.

27. The apparatus of claim 18 wherein the platform employs a rudder having an adjustable deflection angle to cause a change in the yaw angle, the digital processor estimates the side-slip angle from its steady-state value for an arbitrary rudder deflection angle, the relationship between the side-slip angle and its steady-state value being that the side-slip angle approaches its steady-state value exponentially with a predetermined time constant.

28. The apparatus of claim 27 wherein the digital processor uses the steady-state value of the yaw angular velocity to obtain the steady-state value of the side-slip angle by means of a functional relationship between the steady-state value of the yaw angular velocity and the steady-state value of the side-slip angle, the functional relationship having been derived from the equations of motion for the platform.

29. The apparatus of claim 18 wherein the platform employs a rudder having an adjustable deflection angle to cause a change in the yaw angle, the digital processor using the rudder deflection angle and the equations of motion for the platform to estimate the side-slip angle.

30. The apparatus of claim 17 wherein the platform is propelled by a mechanism which runs at one or more speeds, the velocity of the platform being estimated from the speed of the mechanism.

31. The apparatus of claim 17 wherein the platform provides a plurality of measurements over time of the BFR x-component and the BFR z-component of the acceleration of the platform relative to an inertial frame of reference, the digital processor using the measurements of the three components of the acceleration of the platform provided by the platform to estimate the velocity of the platform.

32. The apparatus of claim 17 wherein the platform provides a plurality of measurements over time of the BFR x-component and the BFR y-component of the angular velocity of the platform with respect to an inertial frame of reference, the digital processor computing the transformation matrix from the BFR to a navigation frame of reference using the measured BFR x-component, the measured BFR y-component of platform angular velocity, and the estimated BFR z-component of platform angular velocity.

33. A method for recognizing guidance failures on a mobile platform equipped with a guidance system, the attitude of the platform being defined as a first rotation of an inertial Cartesian coordinate system by a yaw angle about the z-axis, a second rotation by a pitch angle about the y-axis, and a third rotation by a roll angle about the x-axis, the rotated coordinate system being called the body frame of reference (BFR), the x-axis approximating the direction of motion of the platform, the platform providing a plurality of measurements over time of the BFR z-component of the angular velocity of the platform relative to an inertial frame of reference and the BFR y-component of the acceleration of the platform relative to an inertial frame of reference, the platform providing one or more values over time of a quantity from which the velocity of the platform can be estimated, the method comprising the steps:

estimating the velocity of the platform;

estimating the BFR z-component of the angular velocity of the platform with respect to an inertial frame of reference using the measured BFR y-component of acceleration and the estimated velocity;

computing the difference between the measured and the estimated BFR z-component of angular velocity;

indicating a guidance failure if the magnitude of the difference exceeds a threshold level.

34. The method of claim 33 wherein the velocity of the platform is in the direction of the x-axis of a velocity frame of reference, the velocity frame being defined by a rotation of the BFR by a side-slip angle about the z-axis, the platform providing a plurality of measurements over time of the BFR x-component of the acceleration of the platform relative to an inertial frame of reference, the method further comprising the step of estimating the side-slip angle, the measured BFR x-component of the acceleration of the platform and the estimated side-slip angle also being used in the step of estimating the BFR z-component of the angular velocity of the platform.

35. The method of claim 34 further comprising the step of estimating the side-slip angular velocity, the estimated side-slip angular velocity also being used in the step of estimating the BFR z-component of the angular velocity of the platform.

36. The method of claim 35 wherein the platform employs a rudder having an adjustable deflection angle to cause a change in the yaw angle, the step of estimating the side-slip angular velocity using the side-slip angle obtained from the steady-state side-slip angle for an arbitrary rudder deflection angle, the relationship between the side-slip angle and its steady-state value being that the side-slip angle approaches its steady-state value exponentially with a predetermined time constant.

37. The method of claim 36 wherein the step of estimating the side-slip angular velocity uses the steady-state value of the yaw angular velocity to obtain the steady-state value of the side-slip angle, the functional relationship between the steady-state value of the yaw angular velocity and the steady-state value of the side-slip angle resulting from the equations of motion for the platform.

38. The method of claim 35 wherein the platform employs a rudder having an adjustable deflection angle to cause a change in the yaw angle, the platform providing a plurality of values over time for the values of the rudder deflection angle, the step of estimating the side-slip angular velocity using the rudder deflection angle and the equations of motion for the platform.

39. The method of claim 34 wherein the velocity frame is further defined by a rotation by an angle-of-attack about the y-axis, the platform providing a plurality of measurements over time of the BFR x-component of the angular velocity of the platform relative to an inertial frame of reference, the method further comprising the step of estimating the angle-of-attack, the measured BFR x-component of the angular velocity of the platform and the estimated angle-of-attack also being used in the step of estimating the BFR z-component of the angular velocity of the platform.

40. The method of claim 39 further comprising the step of estimating the side-slip angular velocity, the estimated side-slip angular velocity also being used in estimating the BFR z-component of the angular velocity of the platform.

41. The method of claim 39 wherein the step of estimating the angle-of-attack uses the steady-state value of the angle-of-attack for a straight-line platform path, the steady-state value of the angle-of-attack having been determined from the equations of motion for the platform.

42. The method of claim 39 wherein the platform employs an elevator having an adjustable deflection angle to cause a change in the pitch angle, the platform providing a plurality of values over time for the values of the elevator deflection angle, the step of estimating the angle-of-attack using the steady-state value of the angle-of-attack for a straight-line platform path as the estimate of the angle-of-attack, the steady-state value of the angle-of-attack being determined using the elevator deflection angle for a straight-line path and the equations of motion for the platform.

43. The method of claim 34 wherein the platform employs a rudder having an adjustable deflection angle to cause a change in the yaw angle, the step of estimating the side-slip angle uses the steady-state value of the side-slip angle for an arbitrary rudder deflection angle, the relationship between the side-slip angle and its steady-state value being that the side-slip angle approaches its steady-state value exponentially with a predetermined time constant.

44. The method of claim 43 wherein the step of estimating the side-slip angle uses the steady-state value of the yaw angular velocity to obtain the steady-state value of the side-slip angle, the functional relationship between the steady-state value of the yaw angular velocity and the steady-state value of the side-slip angle resulting from the equations of motion for the platform.

45. The method of claim 34 wherein the platform employs a rudder having an adjustable deflection angle to cause a change in the yaw angle, the step of estimating the side-slip angle using the rudder deflection angle and the equations of motion for the platform.

46. The method of claim 33 wherein the platform is propelled by a mechanism which runs at one or more speeds, the step of estimating the velocity of the platform using the speed of the mechanism.

47. The method of claim 33 wherein the platform provides a plurality of measurements over time of the BFR x-component and the BFR z-component of the acceleration of the platform relative to an inertial frame of reference, the step of estimating the velocity of the platform using the measurements of the three components of the acceleration of the platform provided by the platform.

48. The method of claim 33 wherein the platform provides a plurality of measurements over time of the BFR x-component and the BFR y-component of the angular velocity of the platform with respect to an inertial frame of reference, the method further comprising the step of computing the transformation matrix from the BFR to a navigation frame of reference using the measured BFR x-component, the measured BFR y-component of platform angular velocity, and the estimated BFR z-component of platform angular velocity.

* * * * *